US010662318B2

(12) United States Patent
Yamagishi

(10) Patent No.: US 10,662,318 B2
(45) Date of Patent: May 26, 2020

(54) RUBBER COMPOSITION FOR TIRE, PRODUCTION PROCESS FOR SAME, AND TIRE

(71) Applicant: BRIDGESTONE CORPORATION, Tokyo (JP)

(72) Inventor: Yasushi Yamagishi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/307,137

(22) PCT Filed: Apr. 30, 2015

(86) PCT No.: PCT/JP2015/063018
§ 371 (c)(1),
(2) Date: Oct. 27, 2016

(87) PCT Pub. No.: WO2015/166997
PCT Pub. Date: Nov. 5, 2015

(65) Prior Publication Data
US 2017/0051134 A1    Feb. 23, 2017

(30) Foreign Application Priority Data
Apr. 30, 2014   (JP) ................... 2014-093465

(51) Int. Cl.
| | |
|---|---|
| *C08L 9/06* | (2006.01) |
| *C08L 9/00* | (2006.01) |
| *C08K 5/54* | (2006.01) |
| *C08J 3/20* | (2006.01) |
| *C08K 5/103* | (2006.01) |
| *B60C 1/00* | (2006.01) |
| *C08L 7/00* | (2006.01) |
| *C08K 3/36* | (2006.01) |
| *C08K 5/00* | (2006.01) |

(52) U.S. Cl.
CPC ............... *C08L 9/06* (2013.01); *B60C 1/00* (2013.01); *B60C 1/0016* (2013.01); *C08J 3/20* (2013.01); *C08K 3/36* (2013.01); *C08K 5/103* (2013.01); *C08K 5/54* (2013.01); *C08L 7/00* (2013.01); *C08L 9/00* (2013.01); *C08J 2309/06* (2013.01); *C08J 2407/00* (2013.01); *C08J 2409/00* (2013.01); *C08K 5/0025* (2013.01); *C08K 2201/006* (2013.01); *C08K 2201/014* (2013.01); *C08L 2205/03* (2013.01)

(58) Field of Classification Search
CPC ............... C08K 5/11; C08K 3/36; C08L 9/06
USPC ........................................................ 524/317
See application file for complete search history.

(56) References Cited

U.S. PATENT DOCUMENTS

| | | | |
|---|---|---|---|
| 5,714,533 A | 2/1998 | Hatakeyama et al. | |
| 5,717,022 A | 2/1998 | Beckmann et al. | |
| 6,559,209 B1 | 5/2003 | Araki et al. | |
| 2005/0016651 A1* | 1/2005 | Durel | B60C 1/0016 152/209.1 |
| 2009/0292063 A1 | 11/2009 | Robert et al. | |
| 2013/0317151 A1 | 11/2013 | Yagi et al. | |
| 2015/0315358 A1* | 11/2015 | Yonemoto | B60C 1/00 524/313 |
| 2016/0101650 A1* | 4/2016 | Yonemoto | C08L 7/00 152/510 |

FOREIGN PATENT DOCUMENTS

| | | | |
|---|---|---|---|
| JP | 60-13839 A | | 1/1985 |
| JP | 9-118786 A | | 5/1997 |
| JP | 2003-155384 | * | 5/2003 |
| JP | 2013-133401 A | | 7/2013 |
| JP | 2013-245306 A | | 12/2013 |
| WO | 95/31888 A2 | | 11/1995 |
| WO | 97/35461 A2 | | 10/1997 |

(Continued)

OTHER PUBLICATIONS

International Preliminary Report on Patentability dated Nov. 10, 2016, with the Written Opinion of the International Searching Authority issued by the International Bureau in corresponding International Application No. PCT/JP2015/063018.
International Search Report of PCT/JP2015/063018, dated Jun. 30, 2015. [PCT/ISA/210].
Written Opinion of PCT/JP2015/063018, dated Jun. 30, 2015. [PCT/ISA2370].

*Primary Examiner* — Deve V Hall
(74) *Attorney, Agent, or Firm* — Sughrue Mion, PLLC

(57) ABSTRACT

Provided in the present invention is a rubber composition for tires which is improved in a dispersibility of silica in a rubber blended with a large amount of silica having so far made it difficult to be kneaded with the rubber and which makes it possible to carry out simultaneously using silica having a large particle diameter and blending a large amount of silica. Used in the present invention is a rubber composition for tires comprising a natural rubber and/or diene base rubber component, a glycerin fatty acid ester composition containing glycerin fatty acid monoester, and silica, wherein a BET specific surface area of the silica is 100 m$^2$/g or more and 130 m$^2$/g or less, and the rubber composition for tires contains 80 parts by mass or more of the silica based on 100 parts by mass of the rubber component. A tire produced by using the above rubber composition for tires has made it possible to allow a WET performance and a gripping performance to be consistent with an abrasion resistance and has made it possible as well to secure a processability in production by a reduction in a viscosity.

11 Claims, No Drawings

(56) References Cited

FOREIGN PATENT DOCUMENTS

| WO | 2012/070626 A1 | | 5/2012 |
|---|---|---|---|
| WO | WO 2014/098155 | * | 6/2014 |
| WO | WO2014/185545 | * | 11/2014 |

* cited by examiner

RUBBER COMPOSITION FOR TIRE, PRODUCTION PROCESS FOR SAME, AND TIRE

CROSS REFERENCE TO RELATED APPLICATIONS

This is a National Stage of International Application No. PCT/JP2015/63018 filed Apr. 30, 2015, claiming priority based on Patent Application No. 2014-093465 filed Apr. 30, 2014, the contents of all of which are incorporated herein by reference in their entirety.

TECHNICAL FIELD

The present invention relates to a rubber composition for tires in which silica is improved in dispersibility to thereby enhance workability in unvulcanized stage and which can improve and optimize tire performances, a production process for the same, and a tire.

BACKGROUND ART

In recent years, silica is blended and used so frequently as a filler which causes low heat generating property of a rubber composition for tires to be consistent with a gripping property of a tire on a wet road.

A low heat generating property of the rubber composition for tires leads to fuel consumption saving effect of automobiles, and gripping property of a tire on a wet road provides a good effect to safety of a tire.

In this connection, in order to further improving a gripping property of a tire, it is effective to blend silica for capturing a road surface to rubber components in a high content. Further, increasing a particle diameter of silica allows irregularities on a road brought into contact with a tire to be captured more surely by silica particles on the surface of the tire, whereby the tire is further increased in gripping property.

However, silica used tends to cause coagulation of particles themselves by virtue of a hydrogen bond of a silanol group which is a surface functional group, and in order to improve dispersibility of silica in a rubber, kneading time has to be elongated. Also, silica has the defect that Mooney viscosity of a rubber composition for tires is raised due to an unsatisfactory dispersibility of silica in a rubber and that the rubber composition is inferior in processability such as extrusion.

The problems described above are markedly brought about when silica is added in a higher content, and they are a large barrier in increasing a blend amount of silica in a rubber composition for tires.

Accordingly, it is required to improve processability and the like in a rubber composition for tires which is blended with silica in a high content in order to cause the tire to exhibit high gripping property on wet roads and the like.

There have so far been known as a technology for improving a processability and the like in a silica-blended rubber composition for tires prepared by using glycerin fatty acid esters, for example:
1) a rubber composition improved in an electrostatic property which is prepared by blending 100 parts by mass of a rubber containing 90 parts by mass or more of a diene base rubber with 30 to 120 parts by mass of a filler containing 40% by mass or more of a white filler, and 0.2 to 8 parts by mass of a nonionic surfactant (refer to, for example, a patent document 1), and 2) a rubber composition for a tire tread containing at least one polymer selected from the group of diene base rubbers, and 5 to 100 parts by mass of fine powder non-precipitated silicic acid, 0 to 80 parts by mass of carbon black, and 0.5 to 20 parts by mass of at least one non-aromatic viscosity-reducing substance each based on 100 parts by mass of a rubber contained in the rubber composition, wherein the non-aromatic viscosity-reducing substance described above is at least one substance selected from the group consisting of glycerin monostearate, sorbitan monostearate, sorbitan monooleate, and trimethylolpropane(2-ethyl-2-hydroxymethyl-1,3-propanediol) (refer to, for example, a patent document 2).

On the other hand, known as a technology for improving dispersibility of silica in a rubber, processability and the like in a silica-blended rubber composition prepared by using compounds other than the glycerin fatty acid esters described above are, for example:
3) a tire characterized by that a rubber composition prepared by blending at least one rubber component selected from a natural rubber and/or a diene base synthetic rubber with hydrous silicate which has fine pores and in which an ink bottle-shaped pore index (IB) determined by a nitrogen adsorption specific surface area (BET) ($m^2/g$) and prescribed measurement and calculation satisfies a specific formula, and at least one compound selected from the group consisting of specific amide and amine compounds is used for tire members (refer to, for example, a patent document 3), and
4) a composition prepared by blending 100 parts by mass of a rubber component comprising a natural rubber and/or a diene base synthetic rubber with 15 to 85 parts by mass of silica and 1 to 15% by mass of a specific tertiary amine compound such as dimethylalkylamine and the like based on the amount of the silica described above, and a pneumatic tire prepared by using the above composition for a tire tread (refer to, for example, a patent document 4), and
5) a rubber composition prepared by blending a rubber component comprising a natural rubber and/or a diene base rubber with a white filler and at least one specific monoalkanolamide, and a tire prepared by using the above composition (refer to, for example, a patent document 5).

A rubber composition in which glycerin fatty acid monoester is blended together with silica in one of the examples is described in the patent document 1 out of the patent documents 1 to 5, and it is described therein that an effect of preventing electrification which is different from that of the present invention is obtained and that the effect is valid as well for a tire tread part abraded by friction. However, it is neither described nor suggested therein that a viscosity-reducing effect is obtained and that a tire prepared by blending a silica-blended rubber composition blended with glycerin fatty acid monoester is inhibited from being reduced in abrasion resistance.

Also, viscosity-reducing effect observed when the tire is blended with glycerin fatty acid monoester together with silica is described in the foregoing patent document 2, but it is neither described nor suggested therein whether or not a tire prepared by blending a silica-blended rubber composition blended with glycerin fatty acid monoester allows an abrasion resistance to be consistent with viscosity-reducing effect.

It is merely described in the patent document 3 that silica is enhanced in dispersion by using the specific compound, and a glycerin fatty acid monoester composition is not described therein. Also, it is described in the patent document concerned that silica having a large particle diameter is used, but blending the silica having a large particle diameter in a selected high ratio, and the effects thereof are neither described nor suggested therein.

Further, the rubber compositions prepared in the patent documents 4 and 5 described above are improved in dispersibility of silica in a rubber and a heat generating property to such an extent as has not so far been observed. In the patent documents 4 and 5, however, influences of the silica-blended rubber composition on an abrasion resistance of the tire is neither described nor suggested therein.

Further, the rubber compositions prepared in the patent documents 4 and 5 described above are reduced slightly in processability due to shrinkage. Also, the problem that the scorch time is expedited to cause rubber yellowing is brought about in the patent document 4.

In all of the patent documents 3 to 5, the nitrogen base compounds such as amine, amide and the like are used to disperse silica, but in the present invention, the glycerin fatty acid monoester composition which is different from the above nitrogen base compounds is used.

RELATED ART DOCUMENTS

Patent Documents

Patent document 1: International Publication WO95/31888 (claims, examples and the like)
Patent document 2: Japanese Patent Application Laid-Open No. Hei. 9-118786 (claims, examples and the like)
Patent document 3: Japanese Patent Application Laid-Open No. 2013-245306 (claims, examples and the like)
Patent document 4: International Publication WO97/35461 (claims, examples and so on)
Patent document 5: International Publication WO2012/070626 (claims, examples and so on)

DISCLOSURE OF THE INVENTION

Problems Solved by the Invention

The present invention intends to solve the problems on the conventional technologies described above and the like. In the present invention, silica is improved in dispersibility in a rubber composition for tires, whereby an unvulcanized rubber composition for tires is reduced in viscosity to enhance processability thereof. Further, an object of the present invention is to provide a rubber composition for tires which contains 100 parts by mass or more of silica having a large particle diameter (BET specific surface area: 130 $m^2/g$ or less) based on 100 parts by mass of a rubber component, whereby a tire which allows a processability, an abrasion resistance and a rolling resistance to be consistent to a high extent and which is enhanced in a gripping property is obtained in producing tires, and further provide a production process for the same and a tire produced by the same.

Means for Solving the Problems

In the light of the problems on the conventional technologies described above and the like, intense investigations have been repeated by the present inventors to result in finding that a rubber composition for tires which meets the objects described above and a tire prepared by using the above rubber composition are obtained by blending at least one rubber component selected from a natural rubber and/or a diene base synthetic rubber with a high blend amount of silica and a glycerin fatty acid ester composition which is a viscosity reducing agent providing a hydrophobicity.

Further, it has been found that a tire produced from the rubber composition for tires according to the present invention after vulcanization is provided as well with suitable dispersion of silica due to suitable hydrophobicity of the glycerin fatty acid ester composition containing glycerin fatty acid monoester, and thus, the present inventors have come to complete the present invention.

That is, the present invention resides in the following items (1) to (16).

(1) A rubber composition for tires comprising a natural rubber and/or diene base rubber component, a glycerin fatty acid ester composition containing glycerin fatty acid monoester, and silica, wherein a BET specific surface area of the silica is 100 m2/g or more and 130 m2/g or less, and the rubber composition for tires contains 80 parts by mass or more of the silica based on 100 parts by mass of the rubber component.

(2) The rubber composition for tires as described in the above item (1), wherein a content of the silica is 90 parts by mass or more and 130 parts by mass or less based on 100 parts by mass of the rubber component.

(3) The rubber composition for tires as described in the above item (1) or (2), wherein a content of the glycerin fatty acid monoester in the glycerin fatty acid ester composition containing the glycerin fatty acid monoester is 35 to 85% by mass in terms of a mass ratio.

(4) The rubber composition for tires as described in the above item (1) or (2), wherein a content of the glycerin fatty acid monoester in the glycerin fatty acid ester composition containing the glycerin fatty acid monoester is 85 to 100% by mass in terms of a mass ratio.

(5) The rubber composition for tires as described in the above item (1) or (2), wherein the glycerin fatty acid monoester is an ester of glycerin and two or more kinds of fatty acids, and the most fatty acid component among two or more kinds of the fatty acids constituting the glycerin fatty acid ester accounts for 10 to 90% by mass based on the whole fatty acids.

(6) The rubber composition for tires as described in any one of the above items (1) to (5), wherein a blend amount of the glycerin fatty acid ester composition is 0.5 to 20 parts by mass based on 100 parts by mass of the silica.

(7) The rubber composition for tires as described in any one of the above items (1) to (6), wherein 0.25 to 10 parts by mass of the glycerin fatty acid monoester based on 100 parts by mass of the rubber component is blended.

(8) The rubber composition for tires as described in any one of the above items (1) to (7), obtained by blending at least one rubber component selected from the natural rubber and/or the diene base synthetic rubber with the silica and the glycerin fatty acid ester composition and then kneading and vulcanizing the mixture.

(9) The rubber composition for tires as described in any one of the above items (1) to (8), further blended with a silane coupling agent.

(10) The rubber composition for tires as described in any one of the above items (1) to (9), wherein the natural rubber and/or the diene base synthetic rubber contains at least one natural rubber, at least one styrene-butadiene copolymer rubber and at least one polybutadiene rubber.

(11) The rubber composition for tires as described in any one of the above items (1) to (10), wherein the glycerin fatty acid ester composition containing the glycerin fatty acid monoester is a reaction solution of a reaction for a synthesis of a glycerin fatty acid ester.

(12) A production process for a rubber composition for tires comprising a natural rubber and/or diene base rubber component, a glycerin fatty acid ester composition containing glycerin fatty acid monoester, and silica, wherein a BET specific surface area of the silica is 100 m2/g or more and 130 m2/g or less, and 80 parts by mass or more of the silica based on 100 parts by mass of the rubber component is contained in the rubber composition for tires.

(13) The production process for a rubber composition for tires as described in the above item (12), wherein the glycerin fatty acid ester composition containing the glycerin fatty acid monoester is a reaction solution of a reaction for a synthesis of a glycerin fatty acid ester.

(14) The production process for a rubber composition for tires as described in the above item (13), wherein the glycerin fatty acid ester composition containing the glycerin fatty acid monoester is prepared by the reaction for synthesis of the glycerin fatty acid ester synthetic reaction in which an amount of the glycerin fatty acid monoester is controlled.

(15) A tire produced from the rubber composition for tires as described in any one of the above items (1) to (11).

(16) A tire produced by using the production process for a rubber composition for tires as described in any one of the above items (12) to (14).

Effect of the Invention

According to the present invention, use of a glycerin fatty acid ester composition in a rubber blended with a large amount of silica which has so far been hard to be kneaded with the rubber has made it possible to carry out simultaneously using silica having a large particle diameter, blending silica in a large amount and dispersing silica to a high degree in a rubber composition for tires after vulcanization. This has made it possible to cause high gripping performance and wet performance to be consistent with abrasion resistance and provide a rubber composition for tires in which processability can be secured by reducing viscosity.

MODE FOR CARRYING OUT THE INVENTION

The rubber composition for tires according to the present invention comprises a natural rubber and/or diene base rubber component, a glycerin fatty acid ester composition and silica, wherein a BET specific surface area of the silica is 100 m$^2$/g or more and 130 m$^2$/g or less, and the rubber composition for tires contains 80 parts by mass or more of the silica based on 100 parts by mass of the rubber component.

The embodiment of the present invention shall be explained below in detail.

Rubber Component:

The rubber component used for the rubber composition for tires according to the present invention comprises a natural rubber and/or a diene base synthetic rubber. In this connection, the natural rubber (NR) includes RSS, TSR #10, TSR #20 and the like which are usually used for tires, and in addition thereto, it includes a viscosity stabilizer-containing natural rubber, a high purified natural rubber, an enzyme-treated natural rubber, a saponification-treated natural rubber and the like. Capable of being used as the viscosity stabilizer are, for example, hydroxylamine sulfate, semicarbazide ((NH$_2$NHCONH)$_2$) or salts thereof, hydroxylamine, hydrazide compounds (for example, propionic acid hydrazide) and the like. The high purified natural rubber is obtained, for example, by subjecting a natural rubber latex to centrifugal separation to remove non-rubber components such as protein and the like. The enzyme-treated natural rubber is obtained by subjecting a natural rubber to enzyme treatment with enzymes such as protease, lipase, phospholipase and the like. The saponification-treated natural rubber is obtained by subjecting a natural rubber to saponification treatment with alkalis (for example, NaOH) and the like.

The diene base synthetic rubber includes polyisoprene rubbers (IR), polybutadiene rubbers (BR), styrene-butadiene copolymer rubbers (SBR), butyl rubbers (IIR), ethylene-propylene copolymers, and the like. The above diene base synthetic rubbers may be modified polymers or may be used by blending diene base synthetic rubbers (non-modified polymers) with modified polymers.

The above rubber components may be used alone or in a blend of two or more kinds thereof.

Silica:

The silica which can be used for the rubber composition for tires according to the present invention shall not specifically be restricted, and commercial products used for rubber compositions for tires can be used. Among them, wet silica (hydrous silicic acid), dry silica (anhydrous silicic acid), colloidal silica, and the like can be used, and particularly wet silica is preferably used.

Particularly preferred is silica having a BET specific surface area (nitrogen adsorption specific surface area) of preferably 80 to 130 m$^2$/g, more preferably 100 to 130 m$^2$/g.

The BET specific surface area is preferably 130 m$^2$/g or less from the viewpoint that the effects of the present invention are liable to be exhibited by the silica having a relatively large particle diameter, and it is preferably 80 m$^2$/g or more, more preferably 100 m$^2$/g or more from the viewpoint that the abrasion resistance is notably reduced if a particle diameter of the silica is too large.

In the present invention, the BET specific surface area (nitrogen adsorption specific surface area) is measured according to ASTM D3037-88.

A blend amount of the above silica is preferably 80 parts by mass or more, more preferably 90 parts by mass or more, further preferably 115 parts by mass or more and further more preferably 125 parts by mass or more based on 100 parts by mass of the rubber component described above from the viewpoint of the effect of enhancing the gripping property by a large amount of the silica. From the viewpoint of enhancing the workability, the blend amount is preferably 200 parts by mass or less, more preferably 150 parts by mass or less and further preferably 130 parts by mass or less, and it falls in a range of preferably 80 to 200 parts by mass, more preferably 90 to 130 parts by mass. In the case of the present invention, the effects of the present invention can be exerted even when a blend amount of the silica is as high as 80 parts by mass or more based on 100 parts by mass of the rubber component.

Glycerin Fatty Acid Ester Composition:

The glycerin fatty acid ester in the glycerin fatty acid ester composition is obtained by subjecting at least one of 3 OH groups of glycerin to ester bonding with fatty acid (having 8 to 28 carbon atoms), and it is classified into glycerin fatty acid monoester, glycerin fatty acid diester and glycerin fatty acid triester according to the number of the fatty acids bonded to glycerin.

The glycerin fatty acid ester composition used in the present invention contains glycerin fatty acid monoester and glycerin fatty acid diester, and in addition thereto, it may contain glycerin fatty acid triester and glycerin.

In the present invention, the fatty acid constituting the glycerin fatty acid ester has 8 or more carbon atoms, preferably 10 or more carbon atoms, more preferably 12 or more carbon atoms and further preferably 16 or more carbon atoms from the viewpoint of reducing a viscosity of the unvulcanized rubber composition for tires, and it has 28 or less carbon atoms, preferably 22 or less carbon atoms and more preferably 18 or less carbon atoms from the viewpoint of enhancing the heat resistance. The fatty acid constituting the glycerin fatty acid ester is fatty acid having 8 to 28 carbon atoms, preferably 8 to 22 carbon atoms, further preferably 10 to 18 carbon atoms and further more preferably 12 to 18 carbon atoms from the viewpoints of improving the processability by reducing a viscosity of the unvulcanized rubber composition for tires, inhibiting the shrinkage and enhancing the heat resistance. Also, the fatty acid may be any of saturated, unsaturated, linear and branched ones, and linear saturated fatty acids are particularly preferred. The specific examples of the fatty acid include capric acid, lauric acid, myristic acid, palmitic acid, stearic acid, isostearic acid, oleic acid, linoleic acid, and the like. They are preferably lauric acid, palmitic acid and stearic acid, and palmitic acid and stearic acid are particularly preferred.

Fatty acids having less than 8 carbon atoms have a low affinity with polymers and are liable to cause blooming. On the other hand, fatty acids having 28 or more carbon atoms are not different from fatty acids having 28 or less carbon atoms in an effect of improving the processability and elevate the cost, and therefore they are not preferred.

In the glycerin fatty acid ester composition used in the present invention, the fatty acid has 8 to 28 carbon atoms, and the glycerin fatty acid ester contains glycerin fatty acid monoester and glycerin fatty acid diester. Blending of the glycerin fatty acid ester composition makes it possible to inhibit the shrinkage and the rubber scorch, enhance the processability by reducing a viscosity of the silica-blended unvulcanized rubber composition for tires without retarding the vulcanization rate and achieve various performances such as the heat resistance to a high degree.

In the present invention, the glycerin fatty acid ester composition having a high content of monoester causes large shrinkage and raises concerns about the workability, and therefore solving means described later have to be adopted. Also, it tends to reduce a heat resistance of the vulcanized rubber to a large extent.

Accordingly, a content of the monoester in the glycerin fatty acid ester composition is preferably 35% by mass or more, more preferably 40% by mass or more, further preferably 45% by mass or more and further more preferably 50% by mass or more from the viewpoint of reducing a viscosity of the unvulcanized rubber composition for tires, and it is preferably 80% by mass or less, more preferably 75% by mass or less, preferably 35 to 100% by mass, more preferably 40 to 85% by mass, further preferably 45 to 85% by mass, further more preferably 50 to 85% by mass, further preferably 50 to 80% by mass and further more preferably 50 to 75% by mass.

A content of the glycerin fatty acid diester in the glycerin fatty acid ester composition is preferably 10% by mass or more, further preferably 15% by mass or more and further more preferably 20% by mass or more from the viewpoints of inhibiting the shrinkage, controlling the scorch and improving the heat resistance, and from the viewpoint of reducing a viscosity of the unvulcanized rubber composition for tires, it is preferably 65% by mass or less, more preferably 55% by mass or less, further preferably 50% by mass or less, preferably 10 to 65% by mass, more preferably 15 to 55% by mass, further preferably 15 to 50% by mass and further more preferably 20 to 50% by mass.

A mass ratio of the glycerin fatty acid monoester/the glycerin fatty acid diester in the composition described above is preferably 0.5 or more, more preferably 0.8 or more, further preferably 0.9 or more and further more preferably 1.0 or more from the viewpoint of reducing a viscosity of the unvulcanized rubber composition for tires, and it is preferably 10 or less, more preferably 8 or less, further preferably 6 or less, further more preferably 5 or less, further preferably 4 or less and further more preferably 3 or less from the viewpoints of inhibiting the shrinkage, controlling the scorch and improving the heat resistance.

A content of the glycerin fatty acid triester in the glycerin fatty acid ester composition is preferably 10% by mass or less, more preferably 5% by mass or less and further preferably 3% by mass or less from the viewpoint of preventing the rubber physical properties after vulcanized from being excessively reduced (reduction of the storage elastic modulus, and the like), and it may be 0.3% by mass or more from the viewpoint of the productivity.

A total content of the glycerin fatty acid diester and the glycerin fatty acid triester in the glycerin fatty acid ester composition is preferably 15 to 50% by mass, more preferably 17 to 50% by mass from the viewpoints of reducing a viscosity of the unvulcanized rubber composition for tires, inhibiting the shrinkage and improving the heat resistance.

In particular, the glycerin fatty acid ester composition in which a content of the glycerin fatty acid monoester is 50 to 85% by mass and in which a total content of the glycerin fatty acid diester and the glycerin fatty acid triester is 15 to 50% by mass is preferred from the viewpoints of reducing a viscosity of the unvulcanized rubber composition for tires, inhibiting the shrinkage, controlling the scorch and improving the heat resistance, and the glycerin fatty acid ester composition in which a content of the glycerin fatty acid monoester is 50 to 80% by mass and in which a total content of the glycerin fatty acid diester and the glycerin fatty acid triester is 17 to 50% by mass is further preferred. Also, the glycerin fatty acid ester composition in which a content of the glycerin fatty acid monoester is 50% by mass or more and in which a content of the glycerin fatty acid diester is 15 to 50% by mass is preferred, and the glycerin fatty acid ester composition in which a content of the glycerin fatty acid monoester is 50 to 80% by mass and in which a content of the glycerin fatty acid diester is 20 to 50% by mass is further preferred.

In this regard, when the problem of shrinkage can be solved by another solving means, a content of the monoester component in the glycerin fatty acid ester composition is 50 to 100% by mass, preferably 60 to 99% by mass, and more preferably 85 to 98% by mass. In this case, the silica-blended rubber composition can be further improved in processability, rolling resistance and low abrasion property, and it is preferred as well from the viewpoint of the production.

In producing the glycerin fatty acid ester composition used in the present invention, glycerin remains as an unreacted raw material in a certain case. A content of the glycerin in the glycerin fatty acid ester composition is preferably 10% by mass or less, more preferably 5% by mass or less and further preferably 3% by mass or less from the viewpoint of inhibiting a reduction in the heat resistance, and it may be 0.3% by mass or more from the viewpoint of the productivity.

Two or more kinds of the glycerin fatty acid ester compositions which are different in a content of the glycerin fatty acid monoester and a content of the glycerin fatty acid diester may be used.

Further, the glycerin fatty acid ester composition described above is an ester of glycerin and two or more kinds of fatty acids, and the most fatty acid component among two or more kinds of the fatty acids constituting the glycerin fatty acid ester accounts preferably for 10 to 90% by mass based on the whole fatty acids. Blending the glycerin fatty acid ester composition and the silica having a BET specific surface area of 100 m²/g or more and 130 m²/g or less makes it possible to improve abrasion resistance, rolling resistance and processability of the silica-blended rubber composition.

In this respect, the fatty acid component is regarded as one component every fatty acid which is the same in a steric configuration and a bonding state in addition to an alkyl carbon number, that is, every stereoisomer. In a case of, for example, a fatty acid having 18 carbon atoms, n-1-octadecanoic acid (normal linear stearic acid), 2-octyl-1-decanoic acid (stearic acid branched in a 2-position), cis-9-octadecenoic acid (normal oleic acid), cis,cis-9,12-octadecadienoic acid (normal linoleic acid), and the like are regarded as different components.

Also, a mass ratio of two or more kinds of the fatty acids described above is 10 to 90% by mass based on the whole fatty acids even in a case of the most fatty acid component, and it is preferably 15 to 80% by mass, more preferably 20 to 70% by mass and further more preferably 30 to 60% by mass from the viewpoint of further improving processability, rolling resistance and abrasion resistance of the rubber composition. In this case, the silica-blended rubber composition can be further improved in abrasion property, rolling resistance and processability.

The glycerin fatty acid ester composition used in the present invention can be produced by an esterification method in which it is produced from glycerin and fatty acids obtained by decomposing oils and fats and a transesterification method in which it is produced by using oils and fats and glycerin as raw materials, and a method for producing the glycerin fatty acid ester composition in which an amount of monoester is controlled includes the respective methods of 1) to 3) shown below:

1) A method in which an equilibrium composition of esterification is controlled by changing a charge ratio of a fatty acid component and a glycerin component in the esterification method and the transesterification method each described above. Glycerin can be removed by further distilling. Provided that an upper limit amount of the glycerin fatty acid monoester is considered to be about 65% by mass in the light of the reaction characteristics.

2) A method in which reaction products obtained by the esterification method and the transesterification method are further fractionated and distilled off by molecular distillation to obtain glycerin fatty acid monoester of a high purity (usually 95% by mass or more).

3) A method in which the high purity glycerin fatty acid monoester obtained by the method of 2) described above and the middle purity glycerin fatty acid monoester obtained by the method of 1) are mixed in an optional ratio to thereby obtain glycerin fatty acid monoester of a relatively high purity region (about 65 to 95% by mass).

Glycerin fatty acid esters which are reduced in environmental load can be used by using the oils and fats and the fatty acids of the raw materials described above which are derived from natural products.

Further, commercial products in which an amount of monoester is controlled can be used for the glycerin fatty acid ester composition used in the present invention, and the examples of the commercial products include, for example, stearic acid monoglyceride (Leodol MS-60, Excel S-95, manufactured by Kao Corporation) and the like.

In addition, the glycerin fatty acid ester composition used in the present invention may be a reaction solution in a synthetic reaction of a glycerin fatty acid ester regardless of a commercial product. In the above case, the glycerin fatty acid ester composition may be produced by a reaction in which a monoester amount is controlled.

In the present invention, a monoglyceride content (glycerin fatty acid monoester content) in the glycerin fatty acid ester composition shows a value determined according to the following equation (I) by GPC (gel permeation chromatography) analysis, and it means an area ratio of monoglyceride to a sum of glycerin, monoglyceride, diglyceride (glycerin fatty acid diester) and triglyceride (glycerin fatty acid triester) in the GPC analysis:

[Math 1]

$$\text{monoglyceride content (area \%)} = \frac{MG}{[G + MG + DG + TG]} \times 100 \quad (I)$$

in the equation (I) described above, G is a glycerin area in GPC; MG is a monoglyceride area in GPC; DG is a diglyceride area in GPC; and TG is a triglyceride area in GPC.

The measuring conditions of GPC are shown below.
Measuring Conditions of GPC

The GPC was measured by means of the following measuring equipment, and THF (tetrahydrofuran) as an eluent was caused to flow at a flow rate of 0.6 ml/minute to stabilize a column in a thermostatic bath of 40° C. A sample solution 10 yl of 1% by mass prepared by dissolving the sample in THF was injected into the column to measure GPC.

Standard substance: monodispersed polystyrene
  Detector: RI-8022 (manufactured by Tosoh Corporation)
  Measuring equipment: HPLC-8220 GPC (manufactured by Tosoh Corporation)
  Analytical column: two columns of TSK-GEL SUPER H1000 and two columns of TSK-GEL SUPER H2000 (manufactured by Tosoh Corporation) which were connected in series Similarly, a content of the diglyceride in the glycerin fatty acid ester composition means an area ratio of diglyceride to a sum of glycerin, monoglyceride, diglyceride and triglyceride in the GPC analysis.

The examples of the glycerin fatty acid ester composition in which an amount of usable monoester is controlled include, for example, a glyceryl caprylate-containing composition in which fatty acid has 8 carbon atoms, a glyceryl decanoate-containing composition in which fatty acid has 10 carbon atoms, a glyceryl laurate-containing composition in which fatty acid has 12 carbon atoms, a glyceryl myristate-containing composition in which fatty acid has 14 carbon atoms, a glyceryl palmitate-containing composition in which fatty acid has 16 carbon atoms, a glyceryl stearate-containing composition in which fatty acid has 18 carbon atoms, a glyceryl behenate-containing composition in which fatty acid has 22 carbon atoms, and a glyceryl montanate-containing composition in which fatty acid has 28 carbon atoms, and among them, the glyceryl laurate-containing composition, the glyceryl palmitate-containing composition and the glyceryl stearate-containing composition are preferred. The above glycerin fatty acid ester compositions in which an amount of monoester is controlled are optionally selected alone or in a mixture of two or more kinds thereof and blended.

A blend amount of the glycerin fatty acid ester composition used in the present invention is preferably 0.5 part by mass or more, more preferably 1 part by mass or more, further preferably 1.5 part by mass or more, further preferably 2 parts by mass or more and further more preferably 3 parts by mass or more based on 100 parts by mass of the rubber component from the viewpoint of reducing viscosity of the unvulcanized rubber composition for tires, and it is preferably 15 parts by mass or less, more preferably 10 parts by mass or less, further preferably 8 parts by mass or less, preferably 0.5 to 15 parts by mass, more preferably 1 to 10 parts by mass, further preferably 2 to 10 parts by mass, further more preferably 3 to 10 parts by mass, and further more preferably 3 to 8 parts by mass from the viewpoints of inhibiting the rubber physical properties after vulcanized from being excessively reduced (reduction in the storage elastic modulus and the like), controlling the scorch and inhibiting the shrinkage.

Also, a blend amount of the glycerin fatty acid ester composition is preferably 0.5 part by mass or more, more preferably 1 part by mass or more, further preferably 2 parts by mass or more and further more preferably 4 parts by mass or more based on 100 parts by mass of the silica from the viewpoint of reducing viscosity of the unvulcanized rubber composition for tires, and it is preferably 20 parts by mass or less, more preferably 15 parts by mass or less, further preferably 12 parts by mass or less, further more preferably 10 parts by mass or less, preferably 0.5 to 20 parts by mass, more preferably 1 to 15 parts by mass, further more preferably 2 to 12 parts by mass, and further more preferably 4 to 10 parts by mass from the viewpoint of inhibiting the rubber physical properties after vulcanized from being excessively reduced (reduction in the storage elastic modulus and the like).

Carbon Black:

In the present invention, carbon black in addition to the silica described above can be used in combination as a reinforcing filler.

Carbon blacks which can be used shall not specifically be limited, and grades such as, for example, FEF, SRF, HAF, ISAF, SAF and the like can be used.

A blend amount of these carbon blacks shall not specifically be restricted, and it is preferably 0 to 60 parts by mass, more preferably 10 to 50 parts by mass based on 100 parts by mass of the rubber component described above. It is preferably 60 parts by mass or less from the viewpoint of maintaining the heat generating property.

Silane Coupling Agent:

In the present invention, a silane coupling agent is preferably used from the viewpoint of the reinforcing property.

The silane coupling agent which can be used shall not specifically be restricted and includes, for example, at least one of bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, 3-nitropropyldimethoxymethylsilane, 3-chloropyldimethoxymethylsilane, dimethoxymethylsilylpropyl-N,N-dimethylthiocarbamoyl tetrasulfide, dimethoxymethylsilylpropylbenzothiazole tetrasulfide, and the like.

A blend amount of the silane coupling agent is, though varied according to a blend amount of the silica, preferably 1 part by mass or more, more preferably 4 parts by mass or more based on 100 parts by mass of the silica from the viewpoint of the reinforcing property, and on the other hand, from the viewpoint of maintaining the heat generating property, it is preferably 20 parts by mass or less, more preferably 12 parts by mass or less. A blend amount of the silane coupling agent is preferably 1 to 20 parts by mass based on 100 parts by mass of the silica, and it is more preferably 4 to 12 parts by mass from the viewpoint of the heat generating property.

Rubber Composition for Tires:

The rubber composition for tires according to the present invention comprises a natural rubber and/or diene base rubber component, a glycerin fatty acid ester composition containing glycerin fatty acid monoester, and silica, wherein the silica described above has a BET specific surface area of 100 $m^2$/g or more and 130 $m^2$/g or less and is provided with a relatively large particle diameter, and the rubber composition for tires contains the silica in a blend amount as high as 80 parts by mass or more based on 100 parts by mass of the rubber component.

The rubber composition for tires according to the present invention can be blended with the rubber component, the silica and the glycerin fatty acid esters in which an amount of monoester is controlled, each of which is described above, and in addition thereto, blend agents usually used in the rubber industry including, for example, antioxidants, softening agents, stearic acid, zinc oxide, vulcanization accelerators, vulcanization accelerator aids, vulcanizing agents, and the like can suitably be selected and blended therewith as long as the objects of the present invention are not retarded. Commercial products can suitably be used as the above blend agents.

Also, the rubber composition for tires according to the present invention is obtained by blending the rubber component, the silica and the glycerin fatty acid ester having the characteristics described above, if necessary, with various blend agents suitably selected to obtain a mixture and kneading and vulcanizing the mixture. The rubber composition is obtained, for example, by kneading, warming and extruding the mixture described above by means of a kneading equipment such as a roll, an internal mixer and the like, and it is vulcanized after fabrication, whereby it can suitably be used for applications of tire members of a tire, such as a tire tread, an under tread, a carcass, a sidewall, a bead part and the like.

A blend amount of zinc oxide in the rubber composition for tires according to the present invention is preferably 1.5 part by mass or more, more preferably 2.2 parts by mass or more based on 100 parts by mass of the rubber component from the viewpoints of the vulcanization characteristics and the elastic modulus, and it is preferably 12.0 parts by mass or less, more preferably 10.0 parts by mass or less from the viewpoint of the breaking strength.

The reasons why the rubber composition for tires thus constituted improves dispersibility of the silica and the like in the rubber composition for tires, inhibits the rubber scorch, does not retard the vulcanization rate, prevents the processability from being deteriorated by shrinkage, makes it possible to improve the heat resistance and improves the processability are guessed as follows.

That is, in the rubber composition for tires according to the present invention, at least one of the glycerin fatty acid ester compositions which hydrophobize the surface of the silica and act as a lubricant is used in a blend system in which at least one rubber component selected from the natural rubber and/or the diene base synthetic rubber is blended with the silica, whereby it can be reacted with the silica which is a filler, and the unvulcanized rubber composition is further reduced in a viscosity since it has a lubricant action. Also, it is guessed that the shrink property and a reduction in the toughness are improved as well by the silica hydrophobization action, the lubricant action and the plasticizing action. The glycerin fatty acid ester composition in which an amount of monoester is controlled, or the glycerin fatty acid ester composition in which the glycerin fatty acid monoester and the glycerin fatty acid diester are contained in a specific ratio has a higher silica surface hydrophobization effect than those of compositions containing tertiary amines, monoalkanolamides and the like and is reduced in a viscosity, and it is decreased in a shrinkage and improved in a processability more than the compositions containing the above compounds.

Also, because of a suited hydrophobicity of the glycerin fatty acid ester containing glycerin fatty acid monoester, the filler particles are suitably dispersed in the rubber composition for tires even when the silica which is a filler has a large particle diameter. When the silica having a large particle diameter is used, a tire produced by using the other dispersant is reduced in an abrasion resistance, but due to the effect described above, the tire produced by using the rubber composition for tires according to the present invention is not observed to be reduced in an abrasion resistance as is the case with the other dispersant.

Further, in the tire produced by using the rubber composition for tires according to the present invention, the silica contained in the rubber composition for tires after vulcanized is optimally dispersed due to a suited hydrophobicity of the glycerin fatty acid ester composition containing glycerin fatty acid monoester. This allows a flexibility of the rubber after molded to be maintained though the silica is blended in a high amount. Accordingly, the tire is increased in an area brought into contact with the ground and provided with a large frictional coefficient on the road surface, whereby the tire is further enhanced in gripping performance.

Tire and Production of Tire:

A tire can be produced by a usual process using the rubber composition for tires according to the present invention. For example, the rubber composition for tires according to the present invention blended with various blend agents as described above is extruded and processed into a tire member, for example, a member for a tread at an unvulcanized stage, and the member is stuck on a tire under molding by a usual method in a tire molding machine, whereby a green tire is molded. The above green tire is heated and pressed in a vulcanizing machine to obtain a vulcanized tire, whereby the tire is provided with an excellent low heat generating property and a good low fuel consumption, and it is provided as well with an excellent productivity because of a good processability of the above rubber composition for tires.

The tire produced by using the rubber composition for tires according to the present invention shall not specifically be restricted as long as it is applied to vehicles.

The tire produced by using the rubber composition for tires according to the present invention shall not be restricted to pneumatic tires and may be tires which are filled in an inside. Parts for the tire shall meet the conditions of a shape, a structure, a size, a thickness and the like which are used for vehicles.

EXAMPLES

Next, the present invention shall be explained in further details with reference to production examples, examples and comparative examples, but the present invention shall by no means be restricted to the following examples.

The glycerin fatty acid ester compositions used for the rubber compositions for tires in Examples 1 to 3 and Comparative Examples 2 to 3 shown in Table 1 were produced according to Production Example 4.

Production Examples 1 to 9

Glycerin fatty acid ester compositions obtained by the following respective production methods were used. The contents of the respective components of glycerin fatty acid monoester (monoglyceride), glycerin fatty acid diester, glycerin fatty acid triester and glycerin in the respective glycerin fatty acid ester compositions produced were calculated by the methods described above to determine the respective compositions.

Production of Glycerin Fatty Acid Ester Compositions:

Production examples of glycerin fatty acid ester compositions which can be used in the present invention shall be shown below in Production Examples 1 to 9.

Production Example 1

Glycerin Fatty Acid Ester in which Fatty Acid has 8 Carbon Atoms

A 1 L four neck flask equipped with a stirrer, a dehydrating tube-cooling tube, a thermometer and a nitrogen-inlet was charged with 450 g of glycerin and 352 g of octanoic acid (Lunac 8-98, manufactured by Kao Corporation) (glycerin/fatty acid (mole ratio)=2.0), and sodium hydroxide dissolved in a small amount of water was added thereto in an amount of 10 ppm in terms of sodium. Then, the flask was heated up to 240° C. in about 1.5 hour under stirring at 400 r/min while causing nitrogen to flow to a space part on the liquid at a rate of 100 ml/minute. After reached 240° C., water was removed while the acid component was refluxed in the flask, and the reaction was continued for 4 hours at the above temperature. A content of the monoglyceride in the product after the reaction was 67 area %.

Subsequently, the reaction mixture was cooled down to 170° C., and glycerin was removed by distilling the mixture at the above temperature under a reduced pressure of 2.7 kPa or less. Further, steam was supplied to the flask at 150° C. and 2 kPa for 2 hours. Then, the mixture was subjected to adsorption filtration under applying pressure by means of Zeta Plus 30S (manufactured by CUNO Inc.) to obtain a monoglyceride-containing composition. The composition thus obtained was measured by GPC to thereby determine the compositions of the respective components.

Production Example 2: Glycerin Fatty Acid Ester in which Fatty Acid has 10 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of decanoic acid (Lunac 10-98, manufactured by Kao Corporation). The monoglyceride-containing composition obtained after the adsorption filtration was measured by GPC to thereby determine the compositions of the respective components.

Production Example 3: Glycerin Fatty Acid Ester in which Fatty Acid has 12 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of lauric acid (Lunac L-98, manufactured by Kao Corporation). The monoglyceride-containing composition obtained after the adsorption filtration was measured by GPC to thereby determine the compositions of the respective components.

Production Example 4: Glycerin Fatty Acid Ester in which Fatty Acid has 16 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of palmitic acid (Lunac P-95, manufactured by Kao Corporation). The monoglyceride-containing composition obtained after the adsorption filtration was measured by GPC to thereby determine the compositions of the respective components.

The glycerin fatty acid ester compositions used for the rubber compositions for tires in Examples 1 to 3 and Comparative Examples 2 to 3 were produced according to Production Example 4.

Production Example 5: Glycerin Fatty Acid Ester in which Fatty Acid has 16 Carbon Atoms A glycerin fatty acid ester was produced by carrying out the reaction, removing glycerin and carrying out the adsorption filtration in the same manners as in Production Example 1, except that in Production Example 1 described above, an amount of glycerin was changed to 280 g and that octanoic acid was changed to 520 g of palmitic acid (Lunac P-95, manufactured by Kao Corporation) (glycerin/fatty acid (mole ratio)=1.5). The monoglyceride-containing composition obtained after the adsorption filtration was measured by GPC to thereby determine the compositions of the respective components.

Production Example 6: Glycerin Fatty Acid Ester in which Fatty Acid has 16 Carbon Atoms A glycerin fatty acid ester was produced by carrying out the reaction, removing glycerin and carrying out the adsorption filtration in the same manners as in Production Example 1, except that in Production Example 1 described above, an amount of glycerin was changed to 160 g and that octanoic acid was changed to 657 g of palmitic acid (Lunac P-95, manufactured by Kao Corporation) (glycerin/fatty acid (mole ratio)=0.67). The monoglyceride-containing composition obtained after the adsorption filtration was measured by GPC to thereby determine the compositions of the respective components.

Production Example 7: Glycerin Fatty Acid Ester in which Fatty Acid has 18 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of stearic acid (Lunac S-98, manufactured by Kao Corporation) The monoglyceride-containing composition obtained after the adsorption filtration was measured by GPC to thereby determine the compositions of the respective components.

Production Example 8: Glycerin Fatty Acid Ester in which Fatty Acid has 22 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of behenic acid (Lunac BA, manufactured by Kao Corporation) The monoglyceride-containing composition obtained after the adsorption filtration was measured by GPC to thereby determine the compositions of the respective components.

Production Example 9: Glycerin Fatty Acid Ester in which Fatty Acid has 28 Carbon Atoms A glycerin fatty acid ester was produced by carrying out the reaction, removing glycerin and carrying out the adsorption filtration in the same manners as in Production Example 1, except that in Production Example 1 described above, octanoic acid was changed to an equimolar amount of montanoic acid (octacosanoic acid, manufactured by Tokyo Chemical Industry Co., Ltd.). The monoglyceride-containing composition obtained after the adsorption filtration was measured by GPC to thereby determine the compositions of the respective components.

Preparation of Rubber Compositions for Tires:

Rubber compositions were prepared by an ordinary method according to blend prescriptions shown in the following Table 1 and Table 3. Numerical values in Table 1 and Table 3 are shown by mass parts.

The respective rubber compositions for tires for tires thus obtained were used to measure an abrasion resistance, a rolling resistance and a processability by the following measuring methods.

The results thereof are shown in the following Table 1 and Table 3.

TABLE 1

Composition of rubber composition and evaluation of tire performances

|  | Comparative Example | | | | Example | | |
| --- | --- | --- | --- | --- | --- | --- | --- |
|  | 1 | 2 | 3 | 4 | 1 | 2 | 3 |
| Natural rubber *1 | 30 | 30 | 30 | 30 | 30 | 30 | 30 |
| SBR *2 | 50 | 50 | 50 | 50 | 50 | 50 | 50 |
| BR *3 | 20 | 20 | 20 | 20 | 20 | 20 | 20 |
| Carbon black *4 | 6 | 6 | 6 | 6 | 6 | 6 | 6 |
| Silica (normal) *5 | 100 | 115 | 130 | | | | |
| Silica (large grain size) *6 | | | | 100 | 100 | 115 | 130 |
| Silica CTAB (m$^2$/g) | 220 | 220 | 220 | 105 | 105 | 105 | 105 |
| Glycerin fatty acid ester composition *7 | 0 | 1.5 | 2.5 | 0 | 0.5 | 1.5 | 2.5 |
| Stearic acid | 2 | 2 | 2 | 2 | 2 | 2 | 2 |
| Zinc oxide | 3 | 3 | 3 | 3 | 3 | 3 | 3 |
| Wax *8 | 1.5 | 1.5 | 1.5 | 1.5 | 1.5 | 1.5 | 1.5 |
| Antioxidant *9 | 1 | 1 | 1 | 1 | 1 | 1 | 1 |
| Vulcanization accelerator *10 | 0.8 | 0.8 | 0.8 | 0.8 | 0.8 | 0.8 | 0.8 |
| Silane coupling agent *11 | 1.5 | 1.5 | 1.5 | 1.5 | 1.5 | 1.5 | 1.5 |
| Sulfur | 0.8 | 0.8 | 0.8 | 0.8 | 0.8 | 0.8 | 0.8 |
| Abrasion resistance | 100 | 95 | 90 | 90 | 100 | 105 | 110 |
| Rolling resistance | 100 | 95 | 90 | 105 | 110 | 110 | 110 |
| Processability | 100 | 90 | 80 | 105 | 110 | 110 | 110 |

Remarks: items other than silica CTAB, the abrasion resistance, the rolling resistance and the processability were shown by blend parts (weight ratio), wherein a blend part of the rubber component was set to 100.

*1 to *11 in Table 1 and Table 3 show the followings.

*1: RSS #3

*2: SBR #1723 (manufactured by JSR Corporation) (rubber component: 100 parts by mass, oil component: 37.5 parts by mass)

*3: BR01 (manufactured by JSR Corporation)

*4: SEAST 7HM (N234) (manufactured by Tokai Carbon Co., Ltd.)

*5: Trade name Nipsil AQ manufactured by Tosoh Silica Corporation (BET surface area: 190 m$^2$/g)

*6: Trade name Nipsil ER manufactured by Tosoh Silica Corporation (BET surface area: 100 m$^2$/g)

*7: composition shown in Table 2, produced in Production Example 4

*8: Wax microcrystalline wax, Ozoace 0701 (manufactured by Nippon Seiro Co., Ltd.)

*9: Antioxidant N-(1,3-dimethylbutyl)-N'-phenyl-p-phenylenediamine, trade name: Nocrac 6C, (manufactured by Ouchi Shinko Chemical Industrial Co., Ltd.), or 2,2,4-trimethyl-1,2-dihydroquinoline polymer, trade name: NONFLEX RD-S (manufactured by Seiko Chemical Co., Ltd.)

*10: Vulcanization accelerator diphenylguanidine, trade name: NOCCELER D (manufactured by Ouchi Shinko Industrial Co., Ltd.), di-2-benzothiazolyl disulfide, trade name: NOCCELER DM (manufactured by Ouchi Shinko Industrial Co., Ltd.), or N-(tert-butyl)-2-benzothiazolesulfenamide, trade name: Sanceler CM-G (manufactured by Sanshin Chemical Industrial Co., Ltd.)

*11: Silane coupling agent ABC 856 (manufactured by Shin-Etsu Chemical Co., Ltd.)

TABLE 2

Composition of glycerin fatty acid ester composition in the examples and the comparative examples shown in Table 1

| Component | Content (% by mass) |
| --- | --- |
| Glycerin fatty acid monoester | 64 |
| Glycerin fatty acid diester | 34 |
| Glycerin fatty acid triester | 1 |
| Glycerin | 1 |

*fatty acid part: palmitic acid (carbon number n = 16)

The glycerin fatty acid ester compositions having a high content of glycerin fatty acid monoester were blended in Examples 4 and 5 in Table 3.

TABLE 3

|  | Example 4 | Example 5 |
| --- | --- | --- |
| Natural rubber *1 | 30 | 30 |
| SBR *2 | 50 | 50 |
| BR *3 | 20 | 20 |
| Carbon black *4 | 6 | 6 |
| Silica (normal) *5 | | |
| Silica (large grain size) *6 | 130 | 130 |
| Silica CTAB (m$^2$/g) | 105 | 105 |
| Glycerin fatty acid ester composition A *12 | 2.5 | 1.5 |
| Glycerin fatty acid ester composition B *13 | | 1 |
| Stearic acid | 2 | 2 |
| Zinc oxide | 3 | 3 |
| Wax *8 | 1.5 | 1.5 |
| Antioxidant *9 | 1 | 1 |
| Vulcanization accelerator *10 | 0.8 | 0.8 |
| Silane coupling agent *11 | 1.5 | 1.5 |
| Sulfur | 0.8 | 0.8 |
| Abrasion resistance | 111 | 110 |
| Rolling resistance | 130 | 120 |
| Processability | 118 | 116 |

Remarks: items other than CTAB, the abrasion resistance, the rolling resistance and the processability were shown by blend parts (weight ratio), wherein a blend part of the rubber component was set to 100.

*12 to *13 in Table 3 show the followings.

*12: Glycerin fatty acid ester composition A: synthesized according to a method described in Production Example 1 of International Publication No. 2014/098155, except that the fatty acid was changed from octanoic acid to an equimolar amount of palm-originating hardened fatty acid and that molecular distillation was further carried out. A content of glycerin fatty acid monoester was 97% by mass. Stearic acid accounted for 54% by mass; palmitic acid accounted for 42% by mass; and the other acids accounted for 4% by mass each based on the constitutional fatty acids.

*13: Glycerin fatty acid ester composition B: prepared by synthesizing a glycerin fatty acid ester according to a method described in Production Example 4 of International Publication No. 2014/098155 (patent document 1) and subjecting it to molecular distillation. A content of glycerin fatty acid monoester was 97% by mass. Palmitic acid accounted for 99% by mass, and the other acids accounted for 1% by mass each based on the constitutional fatty acids.

Production Process for Rubber Composition for Tires:

Mixing and kneading methods of the respective components blended with the rubber composition for tires in the production process for the rubber composition for tires according to the present invention shall not specifically be restricted. Also, according to the present invention, the components can be mixed, kneaded and vulcanized by means of apparatuses generally used in the technical field concerned.

Abrasion Resistance:
Abrasion Resistance Test

The tires produced from the respective rubber compositions for tires produced in the examples and the comparative examples were used to measure abrasion resistance by means of a Lambourn abrasion tester, wherein an abrasion amount was shown by at a slip rate of 25%, and the measuring temperature was room temperature. The larger the index is, the better the abrasion resistance is. The value was shown by an index, wherein the value in Comparative Example 1 was set to 100. It is shown that the larger the numerical value is, the better the abrasion resistance is.

Rolling Resistance:
Rolling Resistance Test

The rolling resistance was measured and evaluated by a meandering property observed when rotating a tire (195/65R15) in which a tread part was formed based on the rubber composition for tires on a rotary drum provided with a steel flat surface and having an outer diameter of 1707.6 mm and a width of 350 mm at a speed of 80 km/hour under applying a load of 4500 N (460 kg). It is shown that the larger the measured numerical value is, the smaller the rolling resistance is (low fuel consumption), and the value was shown by an index, wherein the value in Comparative Example 1 was set to 100.

Processability:

Processability was obtained by measuring the Mooney viscosity at 130±1° C. by means of an L shaped rotor, and the value was shown by an index, wherein the value in Comparative Example 1 was set to 100.

It is shown that the larger the numerical value is, the better the processability is.

As apparent from the results shown in Table 1, it has become clear that the rubber compositions for tires prepared in Examples 1 to 5 falling in the scope of the present invention are enhanced in a processability and improved as well in an abrasion resistance and a rolling resistance as compared with the rubber compositions for tires prepared in Comparative Examples 1 to 4 falling outside the scope of the present invention

INDUSTRIAL APPLICABILITY

The rubber composition for tires according to the present invention can suitably be used for applications of producing tire members such as tire treads, under treads, carcasses, side walls, and bead parts.

What is claimed is:

1. A rubber composition for tires comprising a natural rubber and/or diene base rubber component, a glycerin fatty acid ester composition containing glycerin fatty acid monoester, and silica, wherein a BET specific surface area of the silica is 100 m$^2$/g or more and 130 m$^2$/g or less, and the rubber composition for tires contains 80 parts by mass or more of the silica based on 100 parts by mass of the rubber component, wherein a content of the glycerin fatty acid monoester in the glycerin fatty acid ester composition containing the glycerin fatty acid monoester is from greater than 85% by mass to 100% by mass in terms of a mass ratio.

2. The rubber composition for tires as described in claim 1, wherein a content of the silica is 90 parts by mass or more and 130 parts by mass or less based on 100 parts by mass of the rubber component.

3. The rubber composition for tires as described in claim 1, wherein the glycerin fatty acid monoester is monoesters of glycerin and two or more fatty acids, and a most fatty acid component accounts for 10 to 90% by mass based on the total fatty acid components of two or more monoesters from glycerin and two or more fatty acids.

4. The rubber composition for tires as described in claim 1, wherein a blend amount of the glycerin fatty acid ester composition is 0.5 to 20 parts by mass based on 100 parts by mass of the silica.

5. The rubber composition for tires as described in claim 1, wherein 0.25 to 10 parts by mass of the glycerin fatty acid monoester based on 100 parts by mass of the rubber component is blended.

6. The rubber composition for tires as described in claim 1, obtained by blending at least one rubber component selected from the natural rubber and/or the diene base synthetic rubber with the silica and the glycerin fatty acid ester composition and then kneading and vulcanizing the mixture.

7. The rubber composition for tires as described in claim 1, further blended with a silane coupling agent.

8. The rubber composition for tires as described in claim 1, wherein the natural rubber and/or the diene base synthetic rubber contains at least one natural rubber, at least one styrene-butadiene copolymer rubber and at least one polybutadiene rubber.

9. The rubber composition for tires as described in claim 1, wherein the glycerin fatty acid ester composition containing the glycerin fatty acid monoester is a reaction solution of a reaction for a synthesis of a glycerin fatty acid ester.

10. A tire produced from the rubber composition for tires as described in claim 1.

11. The rubber composition for tires as described in claim 1, wherein a content of the glycerin fatty acid monoester in the glycerin fatty acid ester composition containing the glycerin fatty acid monoester is 95 to 100% by mass in terms of a mass ratio.

* * * * *